Patented Feb. 28, 1928.

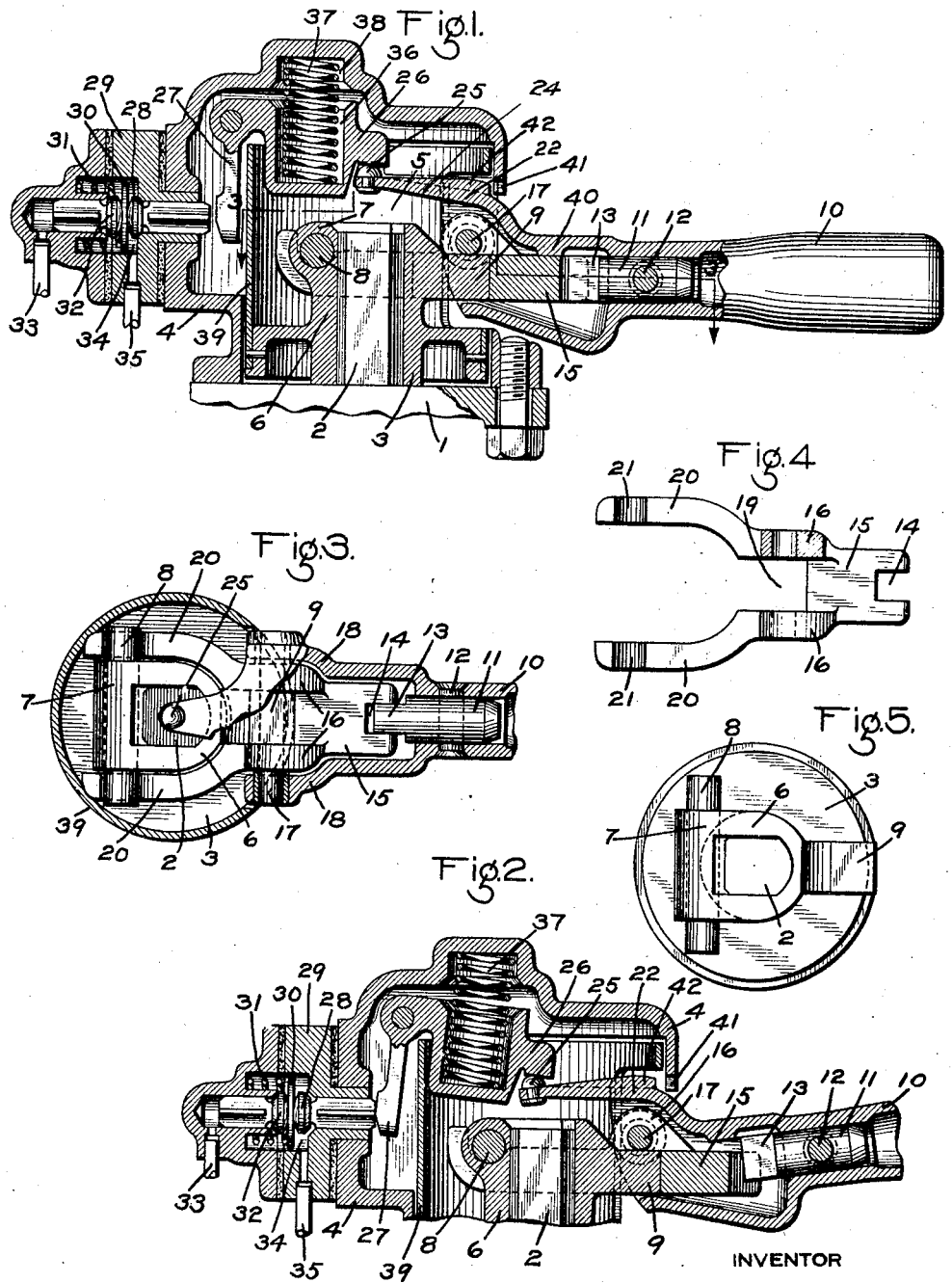

1,660,483

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SAFETY HANDLE DEVICE.

Application filed June 5, 1926. Serial No. 113,915.

This invention relates to handle devices of the type in which the release of the handle by the operator causes an application of the brakes on a car or cars of a train.

It has heretofore been proposed to provide a handle device adapted to be associated with the usual power controller on a car and operating upon release of the handle to effect an emergency application of the brakes.

The principal object of my invention is to provide an improved handle device of the above character and adapted to be applied to a brake valve device.

In the accompanying drawing; Fig. 1 is a vertical section of a handle device applied to a brake valve device and embodying my invention, the handle being shown in its depressed position; Fig. 2 a sectional view similar to Fig. 1, and showing the handle in its released position; Fig. 3 a section on the line 3—3 of Fig. 1; Fig. 4 a detail plan view of the yoke portion of the handle device; and Fig. 5 a plan view of the key engaging member.

As shown in the drawing, the reference numeral 1 indicates the upper portion of the casing of a brake valve device of the usual type adapted to effect the control of the brakes on a car by the manipulation of a handle. A key 2 extends upwardly from the brake valve casing 1 to which an operating handle is applied in the usual brake valve construction.

According to my invention, instead of the usual handle, an operating member 3 is provided, which is adapted to engage the key 2, so that the rotation of said member will operate the usual rotary valve (not shown) of the brake valve device in the usual manner.

Secured to the upper face of the brake valve casing 1 is a cap-like casing 4, provided with a chamber 5 into which the member 3 extends. An upwardly extending sleeve portion 6 of member 3 through which the key 2 extends, is provided with a lug 7 having secured therein a pin 8. At the opposite side, the sleeve portion 6 is provided with a tongue 9.

The operating handle device comprises a handle 10 having an axial bore into which a pin 11 extends, said pin being secured to the handle by a rivet 12. The outer end of said pin is flattened to form a tongue 13 which is adapted to engage in a corresponding slot 14 cut in the end of a yoke member 15. Said yoke member is provided with lugs 16 apertured to receive a pin 17 which extends through openings in the side walls 18 of the handle 10. When the yoke is assembled, the yoke member 15 is pivotally mounted in the pin 17 secured in the handle 10 and has a tongue and groove connection with the pin 11 to permit vertical movement of the handle relative to the yoke member.

The yoke member 15 is provided with a slot 19 for receiving the tongue 9 of the member 3 and the yoke portions 20 of the yoke member 15 are provided near the ends with half round bearings 21 in which the pin 17 is adapted to engage.

The side walls 18 of the handle are connected at the top by a wall 22 and at the bottom by a wall 23 and the upper wall 22 is provided with an extended portion 24 having a rivet 25 with a rounded head secured therein.

A bell crank is pivotally mounted within the casing 4 and one arm 26 of said bell crank extends horizontally and is adapted to be engaged by the rounded head of the rivet 25. The other arm 27 of the bell crank extends vertically and is adapted to engage the stem of a pilot valve 28. Said valve is mounted in a valve casing 29 secured to the cap casing 4 and engages a disk 30 which is subject to the pressure of a spring 31. A poppet valve 32 engages the other side of said disk and controls communication from a fluid pressure supply pipe 33 to valve chamber 34.

Chamber 34 is connected to a safety control pipe 35 which communicates with a valve device (not shown) and adapted upon a reduction in fluid pressure in the control pipe to effect an emergency application of the brakes.

The arm 26 of the bell crank is provided with a pocket 36 into which a spring 37 extends, the spring being extended into a pocket 38 formed in the cap 4. Said spring tends to force the arm 26 downwardly so as to operate the arm 27 to effect the unseating of valve 28 and the seating of valve 32.

A sleeve 39 is secured to the member 3 and is provided with an opening just large enough to permit the insertion of the operating handle device. The cap 4 is also provided with an opening to permit the insertion of the handle device and also to permit a limited horizontal movement of the handle.

To apply the handle device to the brake valve, the yoke member 15 of the handle device is inserted through the openings in the cap 4 and the sleeve 39 so that the bearings 21 engage under the pin 8. The pin 17 engages the upper face of the tongue 9 and the rivet 25 engages the arm 26 of the bell crank. The handle 10 is then depressed, so as to rock the bell crank and cause the arm 27 to be retracted out of engagement with the stem of the valve 28, downward movement of the yoke member 15 being limited by engagement of the pin 17 with the tongue 9. The arm 27 being retracted, the valve 28 will be seated by the pressure of spring 31 and the valve 32 will be unseated, so that fluid under pressure is supplied from pipe 33 to the safety control pipe 35, thus maintaining the fluid pressure in pipe 35 to prevent an application of the brakes.

With the handle 10 held depressed, the handle may be moved horizontally to operate the brake valve through the rotation of the key 2.

If the operator should release the handle 10, the spring 37 will act on the bell crank arm 26 so as to throw the arm 27 outwardly and cause the valve 32 to be seated and the valve 28 unseated. The unseating of valve 28 permits fluid under pressure to be vented from the control pipe 35, whereby an emergency application of the brakes is effected.

The tongue and slot connections between the member 6 and the yoke 15 and between the yoke 15 and the pin 11 provide a rigid connection through which the brake valve may be operated by rotation of the handle 10 and at the same time the tongue 13 permits vertical movement of the handle, as shown in Fig. 2. Downward movement of the handle 10 is limited by engagement of a boss 40 with the upper face of the yoke member 15. The upper edge of the opening in the cap 4 through which the handle extends, is provided with a notch 41 and the handle top wall 22 is provided with a rib 42 which can pass through the notch 41 when it is desired to remove the handle, but which prevents the insertion of a wedge by the operator in case he should attempt to lock the handle depressed so as to relieve him of the necessity of holding the handle depressed.

Having now described my invention, what I claim as new and desire to secure by Letters Patent, is:—

1. In a safety handle device, in combination, a rotatable member, a pin carried by said member, a yoke member straddling said rotatable member and carrying a pin engaging said rotatable member, and a handle mounted to rotate on the last mentioned pin.

2. In a safety handle device, in combination, a rotatable member, a pin carried by said member, a tongue formed on said member, a yoke member straddling said member and engaging said pin and having a slot in which said tongue engages, a handle, and a pin pivotally connecting said handle to said yoke member.

3. In a safety handle device, in combination, a rotatable member, a valve, a bell crank for operating said valve, a spring acting on said bell crank and tending to move said crank to open said valve, a handle operatively connected to said rotatable member and pivotally mounted for vertical movement, and means carried by said handle for operating said bell crank upon vertical movement of the handle.

4. In a safety handle device, in combination, a rotatable member, a pin carried by said member, a projecting portion carried by said member, a yoke member straddling said member and engaging said pin, and said projecting portion engaging in a slot in said yoke member, a handle, a pin pivotally connecting said handle to said yoke member, said pin being adapted to engage said projecting portion.

5. In a safety handle device, in combination, a rotatable member, a yoke member operatively connected to said rotatable member, a handle, a pin secured in a socket in said handle and having a tongue adapted to engage in a slot in said yoke member.

6. In a safety handle device, in combination, a rotatable member, a handle operatively connected to said rotatable member and adapted for vertical movement, a valve, a bell crank operatively connecting said handle to said valve, a spring acting on said bell crank and adapted to oppose vertical movement of said handle.

7. In a safety handle device, in combination, a rotatable member, a casing enclosing said member, a removable handle operatively connected to said member, an opening in said casing for receiving said handle, a sleeve secured to said rotatable member and having an opening adapted in one position of said member to aline with the opening in said casing to permit insertion of the handle.

In testimony whereof I have hereunto set my hand.

CLYDE C. FARMER.